2,229,722

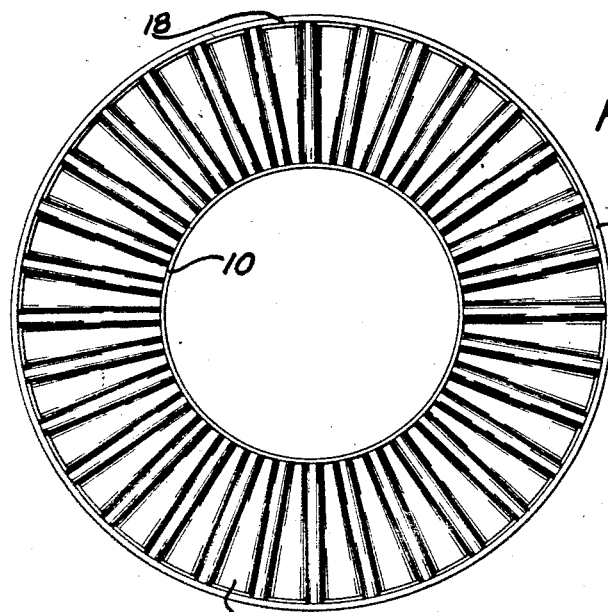
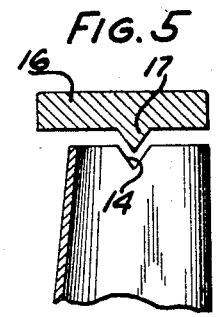
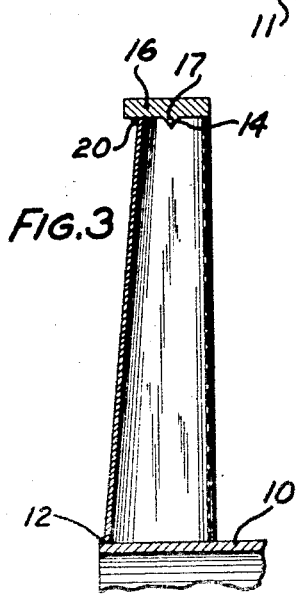
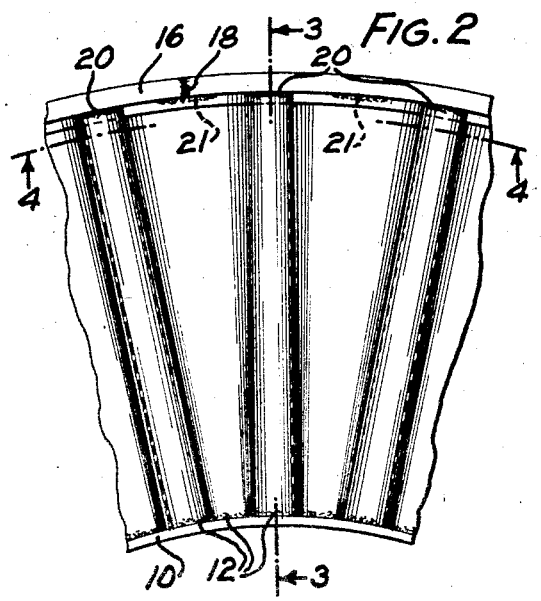
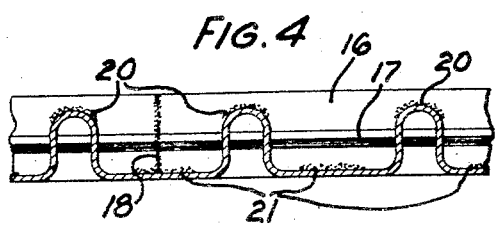
Jan. 28, 1941. A. A. BUREAU 2,229,722
REEL
Filed May 14, 1938
INVENTOR
A. A. BUREAU
BY Emery Robinson
ATTORNEY Patented Jan. 28, 1941

UNITED STATES PATENT OFFICE 2,229,722

REEL

Arthur A. Bureau, Chicago, Ill., assignor to Western Electric Company, Incorporated, New York, N. Y., a corporation of New York Application May 14, 1938, Serial No. 207,937

1 Claim. (Cl. 242—77)

This invention relates to reels and more particularly to reels having metallic head rims.

It is an object of the present invention to provide a rugged, easily assembled reel structure.

In accordance with one embodiment of the invention, as applied to metallic reels for supporting cables, a reel is provided having corrugated heads with the corrugations in the head deeper adjacent the drum of the reel than the periphery of the head and with the corrugated heads constituting a plurality of flat portions joining spoke-like structures. The spoke-like structures are notched at the end thereof adjacent the periphery of the head and a flat metal strip, having a tapered projection formed on one surface thereof, is bent to circular shape and the abutting ends thereof welded together to form a head rim. The rim may then be heated to expand it sufficiently to permit it to be passed over the head, and while held in that position, will be permitted to cool, whereby the rim will shrink onto the corrugated head, the notches in the ends of the spoke structures receiving the projection formed on the rim to properly align the spokes and the contraction of the rim serving to grip the rim in place on the spokes. After the head is thus assembled, the head of the reel may be welded to the rim at predetermined points to provide additional strength.

A clearer understanding of the invention may be had by reference to the appended specification, when considered in conjunction with the accompanying drawing, wherein Fig. 1 is a side elevational view of the reel made in accordance with the present invention;

Fig. 2 is an enlarged fragmentary view of a portion of the reel shown in Fig. 1;

Fig. 3 is a transverse sectional view, taken on the line 3—3 of Fig. 2 in the direction of the arrows;

Fig. 4 is a sectional view, taken on the line 4—4 of Fig. 2 in the direction of the arrows; and Fig. 5 is an enlarged fragmentary view of the outer end of the spoke and the rim just prior to the shrinking of the rim onto the head.

Referring to the drawing, wherein like reference characters designate the same parts throughout the several views, the reel comprises a drum 10 of any suitable construction to which may be welded a head 11 formed by corrugating a rectangular sheet of metal to form it to annular configuration. The head 11 may be a single sheet of metal or may comprise a plurality of sheets of metal formed to the configurations shown and then welded together prior to their assembly on the drum 10. The head 11 has been shown welded to the drum 10 at 12, but it will be understood that any suitable type of drum might be used and that the head might be secured to the drum in any suitable manner.

Prior to corrugating the sheets of metal which ultimately forms the head 11, notches 14 may be cut or punched in the sheet metal stock in a position where, after the sheets are corrugated to form them to annular configuration, the notches 14 will be in alignment about the periphery of the reel head.

A rim 16, formed of a flat metallic strip, having a tapered projection 17 formed thereon, is bent to substantially circular shape and the abutting ends thereof are welded together at 18 to form a continuous ring or rim with the projection 17 extending inwardly. After the ring and head sheet have thus been formed, the ring may be heated sufficiently to cause it to expand enough to permit it to be slipped over the corrugated head with the projection 17 substantially in alignment with the notches 14. As the rim 16 cools, and this may be caused by simply permitting it to stand at room temperature while held in position with respect to the head 11 or the entire structure while held substantially in that position may be cooled artificially, the rim will shrink to force the projection 17 into the notches 14 and if the head structure inadvertently was slightly out of alignment, the rim 16, in shrinking into place, will force the head sheet 11 into the proper position with respect to the rim, thereby tending to straighten any slight irregularities in the head sheet. After the rim has thus been shrunk on the head, it may be secured to the head to form a more unitary structure by welding the rim to the ends of the spokes, as shown at 20—20, and welding the web between the spokes to the rim, as shown at 21. The welding of the head sheet 11 to the rim 16 at these spaced points will permit some movement of the unwelded portions of the head with respect to the rim when the reel is submitted to extraordinary strains.

Another method of mounting the rim 16 on the head 11, which would be within the scope of the present invention, would be to form the rim to substantially circular shape, and before welding the abutting ends thereof together, to assemble it with the projection 17 in the grooves 14 and then weld it as shown at 18.

Although a specific embodiment of the invention has been described hereinbefore, it will be

What is claimed is:

A reel comprising a drum, a head fixed to said drum, said head comprising a sheet material annulus having radial corrugations formed in it, and a series of V-shaped triangular grooves having the apex of the grooves directed inwardly toward the axis of the annulus and formed in the axially extending portions of the corrugations, and a rim having an inwardly extending projection triangular in cross section to grippingly engage in the V-shaped grooves in the annular head sheet.

ARTHUR A. BUREAU.